United States Patent [19]

Redeker et al.

[11] 4,197,250

[45] Apr. 8, 1980

[54] MANUFACTURE OF 1-AMINO-2-BROMO-4-HYDROXYANTHRAQUINONE

[75] Inventors: Joerg Redeker, Ludwigshafen; Heinrich Hiller, Wachenheim; Enno Spohler, Limburgerhof, all of Fed. Rep. of Germany

[73] Assignee: BASF Aktiengesellschaft, Rheinland-Pfalz, Fed. Rep. of Germany

[21] Appl. No.: 887,219

[22] Filed: Mar. 16, 1978

[30] Foreign Application Priority Data

Mar. 28, 1977 [DE] Fed. Rep. of Germany ....... 2713575

[51] Int. Cl.² .......................... C07C 97/26; C09B 1/50
[52] U.S. Cl. ................................ 260/380; 260/687 H
[58] Field of Search ............ 260/380, 381, 694, 687 H

[56] References Cited

U.S. PATENT DOCUMENTS 2,604,480  7/1952  Seymour et al. .................... 260/380

OTHER PUBLICATIONS

*BiOS Final Report,* vol. 1484, p. 5.

*Primary Examiner*—Winston A. Douglas
*Assistant Examiner*—Raymond Covington
*Attorney, Agent, or Firm*—Oblon, Fisher, Spivak, McClelland & Maier

[57] ABSTRACT

In a process for the manufacture of 1-amino-2-bromo-4-hydroxyanthraquinone by hydroxylating previously prepared and isolated 1-amino-2,4-dibromoanthraquinone in sulfuric acid in the presence of boric acid at from 110° to 130° C., the improvememt that 1-aminoanthraquinone is brominated (from 1.5 to 2.1 moles of bromine per mole) in sulfuric acid of from 50 to 85 percent strength at from 80° to 130° C., the reaction mixture is brought to a concentration of from 96 percent strength sulfuric acid to 5 percent strength oleum by adding oleum; and the dibromo compound is then hydroxylated in the presence of boric acid. Very pure 1-amino-2-bromo-4-hydroxyanthraquinone, which can be used for all purposes, is obtained in a high yield.

5 Claims, No Drawings

MANUFACTURE OF 1-AMINO-2-BROMO-4-HYDROXYANTHRAQUINONE

The present invention relates to a process for the manufacture of 1-amino-2-bromo-4-hydroxyanthraquinone by hydroxylating the corresponding 2,4-dibromo compound, wherein the bromination to give the 2,4-dibromo compound and the hydroxylation are carried out as a single-vessel reaction.

1-Amino-2bromo-4-hydroxyanthraquinone is an intermediate for the manufacture of valuable disperse dyes, e.g. 1-amino-2-phenoxy-4-hydroxyanthraquinone and 1-amino-2-alkoxy-4-hydroxyanthraquinones.

BiOS Final Report 1484, page 5, and German Laid-Open Application DOS No. 1,644,622 disclose that 1-amino-2,4-dibromoanthraquinone is converted to 1-amino-2-bromo-4-hyroxyanthraquinone is a mixture of boric acid and oleum of from 2 to 3 percent strength by weight at from 100° to 120° C. or in 96 percent strength by weight sulfuric acid at from 140° to 160° C.

The 2,4-dibromo compound, required as the starting compound, may be prepared, for example, as described in BiOS Final Report 1484, page 6, by brominating 1-aminoanthraquinone in 20 percent strength by weight sulfuric acid at about 80° C.

In attempting to prepare the desired 1-amino-2-bromo-4-hydroxyanthraquinone by brominating 1-aminoanthraquinone in from 90 to 100 percent strength by weight sulfuric acid and then hydroxylating the product, after adding boric acid, with or without increasing the sulfuric acid concentration to 96 percent strength by weight or above by adding oleum, only products of poor quality were obtained. These cannot be used for the manufacture of disperse dyes.

We have found that the process for the manufacture of 1-amino-2-bromo-4-hydroxyanthraquinone by hydroxylating previously prepared and isolated 1-amino-2,4-dibromoanthraquinone in concentrated sulfuric acid in the presence of boric acid at from 110° to 130° C. can be improved by brominating 1-aminoanthraquinone in sulfuric acid of from 50 to 85 percent strength by weight at from 80° to 130° C. with from 1.5 to 2.1 moles of bromine per mole of 1-aminoanthraquinone, bringing the reaction mixture to a concentration of from 96 percent strength by weight sulfuric acid to 5 percent strength by weight oleum by adding oleum, hydroxylating the dibromo compound, in the presence of boric acid, directly at a temperature of from 110° to 130° C., and then isolating the hydroxylated product.

The process according to the invention gives 1-amino-2-bromo-4-hydroxyanthraquinone of very high quality and at the same time gives a substantially higher yield than the processes of the prior art. The product obtained is suitable for all uses.

According to BiOS Final Report 1484, pages 5/6, 100 parts of 1-aminoanthraquinone give 125 parts of 1-amino-2-bromo-4-hydroxyanthraquinone. The process according to the invention gives from 140 to 142 parts of the latter compound per 100 parts of 1-aminoanthraquinone. The purity of the 1-amino-2-bromo-4-hydroxyanthraquinone prepared by the BiOS method is 90%, according to determination by column chromatography/colorimetry; the process according to the invention gives a product which is from 95 to 97% pure.

The process according to the invention is advantageously carried out as follows:

From 1.5 to 2.1 moles of bromine are added to a solution of 1-aminoanthraquinone in sulfuric acid of from 50 to 85 percent strength by weight, and the mixture is stirred for from 2 to 3 hours at from 80 to 130° C. It is then brought to a concentration of from 96 percent strength by weight sulfuric acid to 5 percent strength by weight oleum, by adding oleum. Per mole of aminodibromoanthraquinone, up to 3 moles of boric acid are added before, during or after the addition of the oleum. The mixture is stirred at from 110° to 130° C., resulting in hydroxylation.

The reaction mixture is then worked up in the conventional manner.

The sulfuric acid used for the bromination has a concentration of from 50 to 85 percent strength by weight. Preferably, the bromination is carried out in sulfuric acid of from 75 to 85 percent strength by weight, since in acid of such strength pure products are obtained, and the increase in the concentration of sulfuric acid, for the subsequent hydroxylation, does not entail excessive dilution of the anthraquinone compound.

The amount of sulfuric acid is not critical provided the mixture can be mixed before, during and after bromination. The amount of sulfuric acid is as a rule from 5 to 10 times, preferably from 5.5 to 8 times, the amount by weight of 1-aminoanthraquinone.

The amount of bromine is from 1.5 to 2.1, preferably from 1.7 to 2.0, moles per mole of aminoanthraquinone. Since sulfuric acid acts as an oxidant under the reaction conditions, less than 2 moles of bromine per mole of aminoanthraquinone will also suffice.

The bromination is carried out from 80° to 130° C., preferably from 100° to 110° C. The bromination time depends on the amount of bromine used and especially on the reaction temperature. At from 100° to 110° C., the bromination is as a rule complete after from 1.5 to 2.5 hours.

To carry out the hydroxylation, oleum is added to the bromination mixture. Preferably, the oleum contains from 15 to 35 percent by weight of sulfur trioxide; for example, 24 percent strength oleum may be used. The amount of oleum is chosen so that after it has been added, the concentration of the 1-amino-2,4-dibromoanthraquinone solution is from 96 percent strength by weight sulfuric acid to 5 percent strength by weight oleum.

The boric acid can be added before, during or after the addition of the oleum. In general, from 1.5 to 3 moles, preferably from 2 to 3 moles, of boric acid are used per mole of anthraquinone derivative. The bromine in the 4-position is replaced by hydroxyl at from 110° to 130° C., preferably from 115° to 125° C. At this temperature, hydroxylation is complete in from 2 to 5 hours.

When the reaction mixture has cooled, it is poured into water and the 1-amino-2-bromo-4-hydroxyanthraquinone is isolated in the conventional manner, and dried.

The Examples which follow illustrate the process. Parts and percentages referred to below are by weight. The purity of the products was determined by column chromatography/photometry.

EXAMPLE 1

100 parts of 1-aminoanthraquinone are introduced into 625 parts of 75 percent strength sulfuric acid at room temperature, whilst stirring, and 150 parts of bromine are added. The mixture is stirred for 2 hours at from 100° to 110° C., and 1,750 parts of oleum (containing 24% of SO$_3$) are then added over 10 minutes. 67 parts of boric acid are then introduced and the mixture is stirred for 4 hours at 125° C. Thereafter it is poured out into 3,000 parts of water and the suspension is stirred for ½ hour. It is then filtered and the filter residue is washed neutral and dried.

Yield: 140 parts of 1-amino-2-bromo-4-hydroxyanthraquinone; purity 97%.

EXAMPLE 2

100 parts of 1-aminoanthraquinone and 630 parts of 85 percent strength sulfuric acid are mixed at room temperature. 135 parts of bromine are then added and the mixture is stirred for 2 hours at 100°–110° C. After adding 760 parts of oleum containing 24% of SO$_3$, over 10 minutes, 67 parts of boric acid are added and the mixture is stirred for 4 hours at 125° C. It is then worked up as described in Example 1.

Yield: 142 parts of 1-amino-2-bromo-4-hydroxyanthraquinone; purity 95%.

COMPARATIVE EXAMPLE

100 Parts of 1-aminoanthraquinone were converted to 1-amino-2,4-dibromoanthraquinone as described in BiOS Final Report 1484, page 6, and the isolated dibromo compound was hydroxylated as described on pages 5/6.

Yield: 125 parts of 1-amino-2-bromo-4-hydroxyanthraquinone; purity 91%.

We claim:

1. In a process for the preparation of 1-amino-2-bromo-4-hydroxyanthraquinone by hydroxylating previously prepared and isolated 1-amino-2,4-dibromoanthraquinone in concentrated sulfuric acid in the presence of boric acid at from 110° to 130° C., and isolating the hydroxylated product, the improvement that 1-aminoanthraquinone is brominated with from 1.5 to 2.1 moles of bromine per mole of 1-aminoanthraquinone in sulfuric acid of from 50 to 85 percent strength by weight at from 80° to 130° C., the reaction mixture is brought to a concentration of from 96% strength by weight sulfuric acid to 5% strength by weight oleum, by adding oleum, and the dibromo compound obtained is hydroxylated without intermediate isolation in the presence of boric acid.

2. A process as claimed in claim 1, wherein the bromination is carried out in sulfuric acid of from 75 to 85 percent strength by weight.

3. A process as claimed in claim 1, wherein the bromination is carried out with from 1.7 to 2 moles of bromine.

4. A process as claimed in claim 1, wherein the bromination is carried out at from 100° to 110° C.

5. In a process for the preparation of 1-amino-2-bromo-4-hydroxyanthraquinone by hydroxylating previously prepared and isolated 1-amino-2,4-dibromoanthraquinone in concentrated sulfuric acid in the presence of boric acid at from 110° to 130° C., and isolating the hydroxylated product, the improvement that 1-aminoanthraquinone is brominated with from 1.7 to 2 moles of bromine per mole of 1-aminoanthraquinone in sulfuric acid of from 75 to 85 percent strength by weight at from 100° to 110° C., the reaction mixture is brought to a concentration of from 96% strength by weight sulfuric acid to 5% strength by weight oleum, by adding oleum, and the dibromo compound obtained is hydroxylated without intermediate isolation in the presence of boric acid.

* * * * *